United States Patent [19]

Wistuba et al.

[11] Patent Number: 4,594,841
[45] Date of Patent: Jun. 17, 1986

[54] FORAGE CUTTER OR CHOPPER

[75] Inventors: Eberhard Wistuba, Rettenbach; Xaver Lenzer, Kötz, both of Fed. Rep. of Germany

[73] Assignee: Karl Mengele & Söhne GmbH & Co., Günzberg, Fed. Rep. of Germany

[21] Appl. No.: 703,707

[22] Filed: Feb. 21, 1985

[30] Foreign Application Priority Data

Feb. 21, 1984 [DE] Fed. Rep. of Germany ....... 3406201

[51] Int. Cl.⁴ ............................................. A01D 87/10
[52] U.S. Cl. ..................................... 56/13.3; 56/16.4; 241/101.7
[58] Field of Search .................. 56/1, 12.7, 12.8, 13.3, 56/13.4, 16.4, 60; 241/101.7, 221, 222

[56] References Cited

U.S. PATENT DOCUMENTS 2,442,520  6/1948  Van Sickle ............................ 56/60
2,661,585 12/1953  Hansen ............................... 56/13.3

FOREIGN PATENT DOCUMENTS 3133287  3/1983  Fed. Rep. of Germany ....... 56/13.3
2012540  8/1979  United Kingdom ................ 56/12.7
1042661  9/1983  U.S.S.R. ............................. 56/13.3

OTHER PUBLICATIONS

Claas, Jaguar 690/685/680/675-Jan. '84.

Primary Examiner—Gene Mancene
Assistant Examiner—David I. Tarnoff
Attorney, Agent, or Firm—Toren, McGeady, Stanger, Goldberg & Kiel

[57] ABSTRACT

In a forage cutter, a cutting wheel is rotatably mounted within a housing. For an angular portion of the wheel relative to the housing, its outer circumferential periphery is positioned adjacent to a backing wall of the housing. Alternating knives and blades are attached to the cutting wheel about its circumferential periphery with the knives coacting with a stationary cutting plate to cut forage material introduced into the housing. After the material is cut it is carried downwardly to a space where it is crushed and the crushed material is moved upwardly by the blades on the cutting wheel to an outlet passageway. The crushing space is provided by diverging the backing wall outwardly from the outer circumferential periphery of the cutting wheel. Following the crushing space, the backing wall converges inwardly toward the outer circumferential periphery of the cutting wheel. The outlet passageway follows the inwardly converging backing wall in the direction of rotation of the cutting wheel. The crushing action is afforded by cooperating crushing rollers or by a crushing roller cooperating with a friction surface.

10 Claims, 3 Drawing Figures

FORAGE CUTTER OR CHOPPER

BACKGROUND OF THE INVENTION

The present invention is directed to a forage cutter or chopper with means for conveying the forage material within a housing where it is crushed between a pair of rollers or between a roller and a friction surface.

A forage cutter of this type is disclosed in French Pat. No. 2 455 852. The material cut in this device is conveyed in the upward direction by the cutter cylinder of a drum cutter and is directed to a crushing roller rotating within the cutter housing and the material is drawn into a slot by the roller with the slot located between impact bars on the roller and the bottom of the cutter cylinder whereby the material is crushed. After the crushing operation, the material is conveyed by a roller to blades aligned with a blade wheel axis extending perpendicularly to the axle of the drum cutter so that the crushed material is carried along.

In such an arrangement the blade wheel is expensive and its drive requires a comparatively costly power supply set-up.

In view of the considerable amount of equipment involved and its weight, and the unloading of the equipment, this known cutter is difficult to use in the field as a forage harvester and requires a heavy frame and support means.

SUMMARY OF THE INVENTION

Therefore, the primary object of the present invention is to provide a less expensive forage cutter as compared to the known type and one which is easier to handle in the field.

In accordance with the present invention, the housing of a forage cutter, particularly a flywheel or disc wheel cutter, is provided, at an angularly spaced location from a stationary cutting plate, with a space extending outwardly from the radially outer circular path of blades on the cutter wheel and means are located in the space for effecting the crushing action of the material being processed. The forage cutter housing has a backing wall extending along the outer circular path of the blades on the wheel and the crushing space is provided by diverging the backing wall outwardly from the circular path Following the crushing space in the rotational direction of the cutter wheel, the backing wall converges inwardly toward the outer circular path of the blades for conveying the crushed material upwardly into an outlet passageway for directing the material out of the housing.

In accordance with the concept of the present invention, the cutter wheel includes alternating knives and blades with the blades carrying the material around the interior of the housing. Initially, the blades direct the cut material to the crushing means. Downstream from the crushing space, the blades carry the crushed material upwardly affording a surprisingly simple, light and compact construction which involves considerable cost reduction for carrying the material within the cutter and also lowers the requirements for power supply.

Preferably, the invention is used in a flywheel cutter. Different embodiments of the forage cutter are disclosed in the drawings.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which thre are illustrated preferred embodiments of the invention.

DETAILED DESCRIPTION OF THE INVENTION

Figure 1:
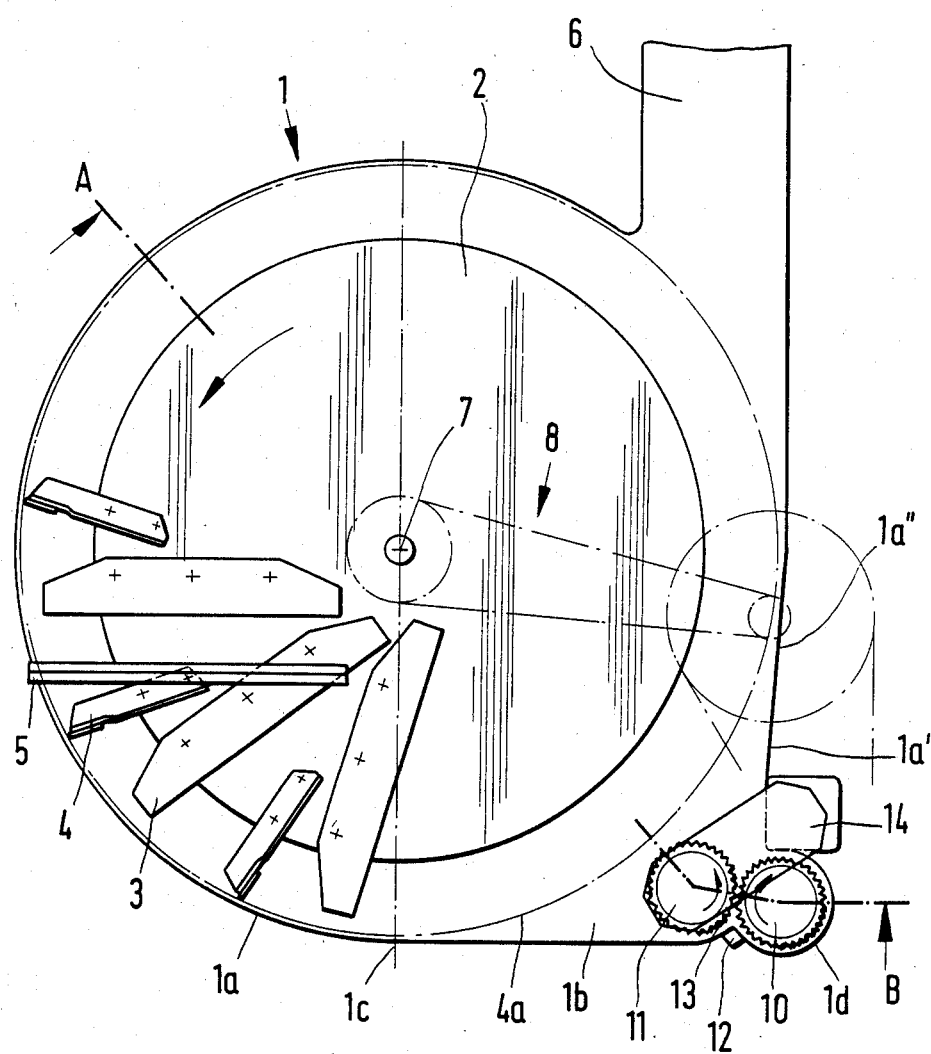
FIG. 1 is a schematic elevational view of a flywheel cutter embodying the present invention.

In the drawing a flywheel forage cutter is shown schematically and includes a generally vertically arranged housing 1 containing a cutting wheel 2 having an outer circumferentially extending peripheral edge spaced inwardly from the housing with knives 3 and blades 4 extending generally radially outwardly from the peripheral edge of the wheel 2. A stationary cutting plate 5 is located within the housing adjacent to the inlet through which the forage material to be cut is introduced. The radially outer ends of the knives 3 are spaced closely inwardly from the radially outer ends of the blades 4. As can be seen in FIG. 1, the radially outer ends of the blades 4 move along a circular path 4a located at the inner surface of a backing wall 1a of the housing. As the cutting wheel 2 is rotated the blades 4 pick up the material cut by the coacting combination of the knives 3 and the fixed cutting plate 5 and carry the material along the inside surface of the backing wall 1a. On the opposite side of the housing from the cutting plate 5, an outlet passageway 6 opens from the housing for discharging the material processed within the housing. The apparatus for supplying the forage material into the housing 1 consists of a corn gripping or feeding device, not shown. Cutting wheel 2 is rotatably mounted on a shaft 7 and is driven by a belt drive 8.

In addition to the backing wall 1a, the housing 1 is formed of two side walls extending generally parallel to the cutting wheel with the shaft 7 of the cutting wheel extending through the side walls. The cutting wheel 2 is arranged vertically with the two side walls 1b also extending vertically. Backing wall 1a extends between and interconnects the side walls 1b and for the major portion of its angular extent it extends around the outer circumferentially extending peripheral edge of the cutting wheel 2 spaced radially outwardly from the cutting wheel. The knives 3 and the blades 4 project generally radially outwardly from the circumferential edge of the wheel toward the inside surface of the backing wall 1a. As indicated in FIG. 1 the dot-dash line represents the circular path of travel 4a of the radially outer end of the blades 4, the inside surface of the backing wall is located in almost sliding contact with the radially outer edges of the blades 4. Starting from the outlet passageway 6 in the direction of rotation of the cutting wheel 2 as shown by the arrow in FIG. 1, the backing wall 1a follows along the circular path 4a of the outer edge of the blades 4 through more than 180° until it reaches the vertical axis extending through the shaft 7 at which point the backing wall 1a extends as a horizontal section 1c tangential to the backing wall 1a and to the circular path 4a. As a result, the backing wall section 1a diverges away from the path 4a and defines an enlarged crushing space in one lower corner of the housing. In FIG. 1, in this lower corner the backing wall 1a forms an outward protrusion 1d. A crushing roller 10 is positioned within the protrusion 1d and cooperates with a second crushing roller 11 located within the lower corner of the housing adjacent to the roller 10. As indicated by the arrows on rollers 10 and 11, these rollers rotate in opposite directions.

An adjustment device 12, at the transition from the backing wall section 1c to the protrusion 1d of the housing, accords an adjustment of the crushing roller 11 or of the feed slot 13 forming the path between the crushing rollers 10 and 11. With this adjustment device the space between the crushing rollers 10 and 11 can be regulated. Crushing roller 11 is supported on brackets 14 which afford an additional adjustment of the feed slot or path between the crushing rollers 10, 11. Immediately above the protrusion 1d the backing wall 1a has a section 1a' which extends generally vertically and slightly outwardly with a backing wall section 1a'' located above it converging inwardly toward the circular path 4a. At about the location of the horizontal plane through the shaft 7 indicated by a dash-dot line, the backing wall converts into the vertically extending outlet passageway 6. The outlet passageway 6 receives the materials cut and crushed within the housing for discharge out of the housing.

Figure 2:
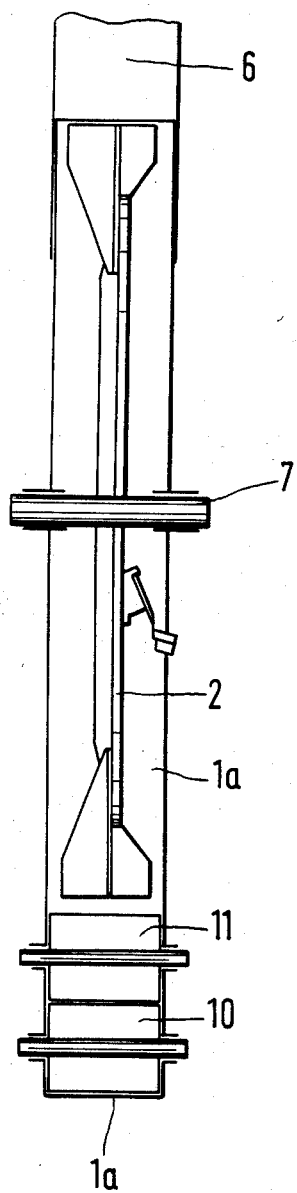
FIG. 2 is a side view of the flywheel cutter taken along the line A—B in FIG. 1.
Figure 3:
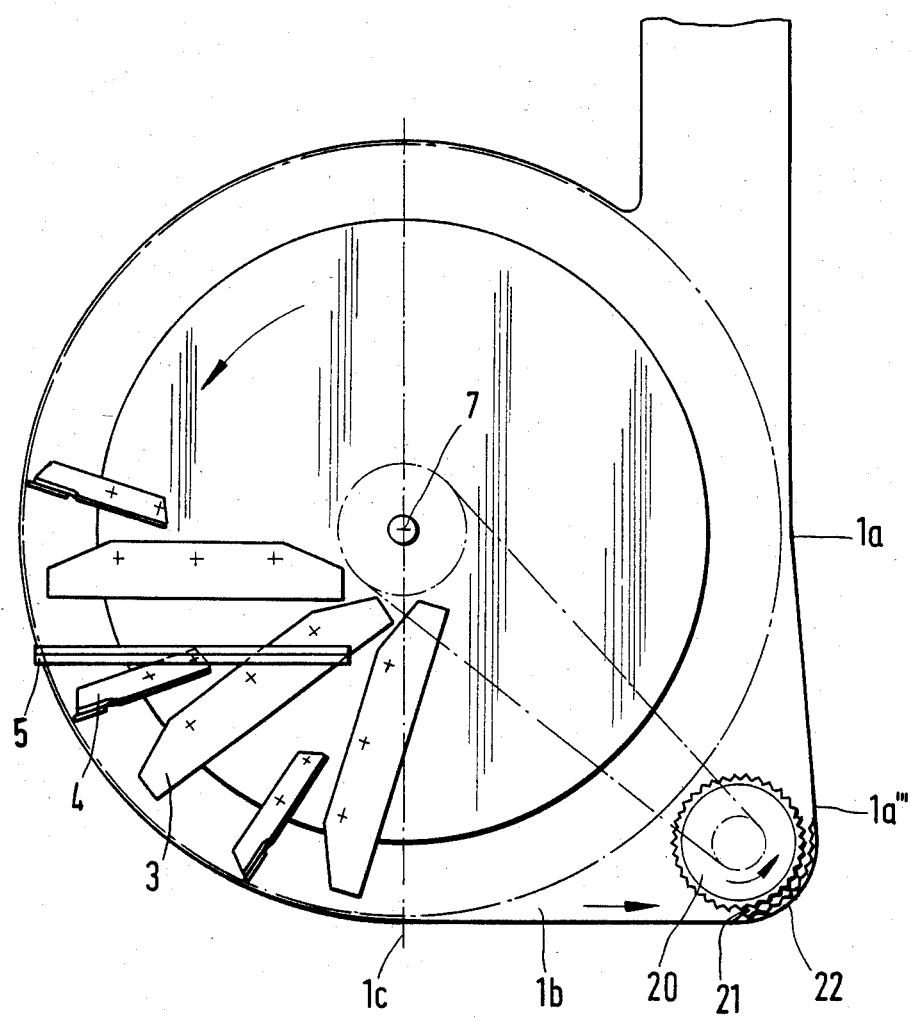
FIG. 3 is a view similar to FIG. 1 illustrating another embodiment of the present invention.

In FIG. 3 another embodiment is illustrated of the forage cutter which differs from the embodiment in FIGS. 1 and 2 in that there is no protrusion 1d formed in the housing and a single crushing roll 20 is provided in the space between the circular path 4a and the inside of the housing. The crushing roll 20 is located closely inwardly from the backing wall portion 1a''' defining the lower corner of the housing. The crushing roller 20 is rotated in the direction shown by the arrow which is similar to the direction in which the cutting wheel rotates within the housing. The cut forage material pushed along by the blades 4 is directed into a feed slot or space 21 between the impact elements on the crushing roller 20 and a complementary shaped frictional surface 22 lining the backing wall portion 1a''' and spaced closely outwardly from the surface of the crushing roller 20.

The flywheel forage cutter, with the crushing means arranged downstream of the cutting means and upstream of the outlet passageway, functions as follows:

The forage material is introduced into the housing through an inlet opening, not shown, and the material is cut or chopped by the interaction of the angularly spaced cutters 3 with the stationary cutting plate 5. The cut material is carried downwardly from the cutting plate 5 by the blades 4 which extend outwardly to the inside surface of the backing wall 1a so that the radially outer edges of the blades slide downwardly along the inside surface of the backing wall. At the point where the backing wall 1a diverges outwardly from the path 4a the blades continuing to move along the path 4a and direct the cut material toward the crushing roller 11 or 20. The material in the embodiment in FIG. 1 is carried along by the crushing roller 11 passing into the slot or passage 13 and being crushed as it passes between the closely spaced surfaces of the crushing rollers 10, 11. In the embodiment of FIG. 3 the cut material is moved by the crushing roller 11 into the passage between the roller and the friction surface 22. In each embodiment, it is possible to adjust the space between the crushing surfaces so that corn grain, cereal grains and the like are crushed as they move through the passage 13 or 21. The crushed material flowing from between the crushing surfaces is directed in the vertical direction between the backing wall above the crushing surfaces and the radially outer surface of the cutting wheel 2. The crushing rollers 10, 11 or the crushing roller 20, due to rapid rotation, cause the crushed material to move upwardly. As the material moves upwardly, it is again picked up by the blades 4 at the latest when it reaches the backing wall section 1a'' at the location of the horizontal plane extending through the shaft 7 and designated by the dot-dash line. Above this point the blades 4, rotating with the wheel 2, throw the cut and crushed material into the outlet passageway 6 for discharge out of the housing 1.

In the event the crushing rollers 10, 11 or the crushing roller 20 and the complementary crushing surface 22 do not pass the material to be crushed it is displaced into a position where it is picked up by the blades 4 for movement out of the housing. As a result, blockages of the cutting apparatus are avoided.

While specific embodiments of the invention have been shown and described in detail to illustrate the application of the inventive principles, it will be understood that the invention may be embodied otherwise without departing from such principles.

We claim:

1. Forage cutter including a housing, means within said housing for conveying the forage material to be cut, and means within said housing for receiving cut material for crushing the material, wherein the improvement comprises a cutting wheel rotatably mounted within said housing, said housing comprises a pair of laterally spaced side walls located on opposite sides of said cutting wheel and a backing wall extending between said, side walls and extending around the outer circumferential periphery of said cutting wheel, said cutting wheel having knives and blades secured thereto with said knives and blades alternating around said wheel, a fixed cutting plate mounted in said housing and cooperating with said knives for cutting material introduced into said housing, a shaft located within said housing and extending between said side walls, said cutting wheel mounted for rotation on said shaft, said knives and said blades projecting generally radially outwardly from the outer circumferential periphery of said cutting wheel, the radially outer edges of said blades rotating along a circular path within said housing, along a portion of said circular path of said blades said backing wall is spaced closely from the circular path, in the direction of rotation of said cutting wheel downstream from said cutting plate said backing wall diverges outwardly from said circular path of said blades and forms in combination with said side walls a space for receiving material carried along by said blades from said cutting plate, said crushing means located within said space outwardly from said circular path of said blades for receiving and crushing the cut material, said cutting wheel being vertically arranged with said side walls extending generally vertically, said space being located in a lower part of said housing, above said space said backing wall converges inwardly toward said circular path of said blades, and a material discharge outlet passageway opening through said housing extends outwardly from said housing above the location where said backing wall converges inwardly for receiving the material crushed in said space so that the material can be carried upwardly by said blades along said backing wall into said outlet passageway.

2. Forage cutter, as set forth in claim 1, wherein said backing wall forms an outward protrusion from said housing in the lower part of said housing opening to said space, and above said protrusion said backing wall extends approximately tangentially to the circular path of said blades.

3. Forage cutter, as set forth in claim 2, wherein said crushing means comprises a pair of crushing rollers, one of said crushing rollers being located within said protrusion, the other said crushing roller being located within said space in said housing between said one crushing roller and said circular path of said blades, and said crushing rollers being spaced relative to one another to form a conveying slot therebetween for the passage of the cut material to be crushed.

4. Forage cutter, as set forth in claim 1, wherein said backing wall defining at least a portion of said space is arcuately shaped, a friction surface member supported on the arcuately shaped section of said backing wall, a crushing roller located within said space outwardly from said circular path of said blades and closely adjacent said friction surface member with said crushing roller and friction surface member forming therebetween an arcuately shaped slot-like passage through which the material being crushed between said roller and friction surface passes.

5. Forage cutter, as set forth in claim 3, wherein said other roller is adjustably positionable relative to said one roller located in said protrusion whereby the space between said rollers is adjustable.

6. Forage cutter, as set forth in claim 3, including adjustment means mounted in said backing wall for adjusting said protrusion relative to said housing so that the space between said crushing rollers can be adjusted.

7. Forage cutter, as set forth in claim 3, wherein said crushing rollers rotate in opposite directions relative to one another.

8. Forage cutter, as set forth in claim 3, wherein said other crushing roller is a driven roller and said one crushing roller is an idling roller.

9. Forage cutter, as set forth in claim 1, wherein the radially outer ends of said blades project outwardly beyond the radially outer ends of said knives.

10. Forage cutter, as set forth in claim 1, wherein said housing has a vertical axis intersecting the axis of said shaft and a horizontal axis intersecting the axis of said shaft so that said horizontal and vertical axes are disposed at right angles to one another, said cutting plate located within said housing below said horizontal axis and spaced angularly upwardly from the intersection of said vertical axis and the lower part of said backing wall, said crushing rollers located in said space being positioned below said horizontal axis and on the opposite side of said vertical axis from said cutting plate, and said outlet passageway being located above said horizontal axis and located on the same side of said vertical axis as said crushing rollers.

* * * * *

Notice of Adverse Decision in Interference

In Interference No. 102,440, involving Patent No. 4,594,841, E. Wistuba, X. Lenzer, FORAGE CUTTER OR CHOPPER, final judgement adverse to the patentees was rendered Dec. 18, 1990, as to claims 1-10.

*(Official Gazette March 5, 1991)*